United States Patent [19]
Riley

[11] Patent Number: 6,009,197
[45] Date of Patent: Dec. 28, 1999

[54] METHOD AND APPARATUS FOR GENERATING IMAGE DATA

[75] Inventor: Andrew James Riley, Bedfordshire, United Kingdom

[73] Assignee: Fujifilm Electronic Imaging Ltd., London, United Kingdom

[21] Appl. No.: 08/779,895

[22] Filed: Jan. 7, 1997

[30] Foreign Application Priority Data

Jan. 31, 1996 [GB] United Kingdom ............ 9601957

[51] Int. Cl.$^6$ .............. G06K 9/48; G06K 9/20; G06K 9/36; H04N 1/387
[52] U.S. Cl. ............ 382/199; 382/282; 382/299; 358/453
[58] Field of Search ............ 358/449–453; 382/299, 199, 283, 282, 205, 190, 195, 298

[56] References Cited

U.S. PATENT DOCUMENTS

| | | | |
|---|---|---|---|
| 4,763,200 | 8/1988 | Nakatani et al. | 358/449 |
| 5,260,804 | 11/1993 | Fukutomi et al. | 358/444 |
| 5,353,130 | 10/1994 | Hasegawa | 358/530 |
| 5,440,403 | 8/1995 | Hashimoto et al. | 358/444 |

FOREIGN PATENT DOCUMENTS

| | | | |
|---|---|---|---|
| 0 371 744 A2 | 11/1989 | European Pat. Off. | H04N 1/00 |
| 0 371 744 A3 | 11/1989 | European Pat. Off. | H04N 1/00 |
| 0 416 654 A2 | 9/1990 | European Pat. Off. | H04N 1/46 |
| 0 453 802 A2 | 10/1991 | European Pat. Off. | |
| 0 500 112 A2 | 2/1992 | European Pat. Off. | H04N 1/38 |
| 0 500 112 A3 | 2/1992 | European Pat. Off. | H04N 1/38 |
| 0 598 584 A1 | 11/1993 | European Pat. Off. | H04N 1/00 |
| 0598584 | 5/1994 | European Pat. Off. | H04N 1/00 |

OTHER PUBLICATIONS

British Standard Search Report.
"Linocolor Referenzbandbuch" Nov. 1992, Linotype–Hell AG, Eschborn, Germany XP002007946, p. 4–3—p. 4–38.
European Search Report dated Jun. 20, 1997.
John C. Russ "The Image Processing Handbook", 2nd edition, CRC Press, p. 155, 1995.

*Primary Examiner*—Bijan Tadayon
*Assistant Examiner*—Dmitry A. Novik
*Attorney, Agent, or Firm*—Sughrue, Mion, Zinn, Macpeak & Seas, PLLC

[57] ABSTRACT

A method of generating image data comprising digital pixel data representative of one or more images on an input scanner support.

In a first step the support is scanned to generate support image data at a first resolution comprising digital pixel data representative of the support and image.

In a second step support image data at a second resolution is generated from the support image data at a first resolution. In a third step the boundary of an image is determined by performing a predetermined boundary determining algorithm on the support image data at the second resolution.

In a fourth step, the image data is extracted from the support image data at the first resolution by extracting pixel data within the boundary of the image determined in the third step.

18 Claims, 5 Drawing Sheets

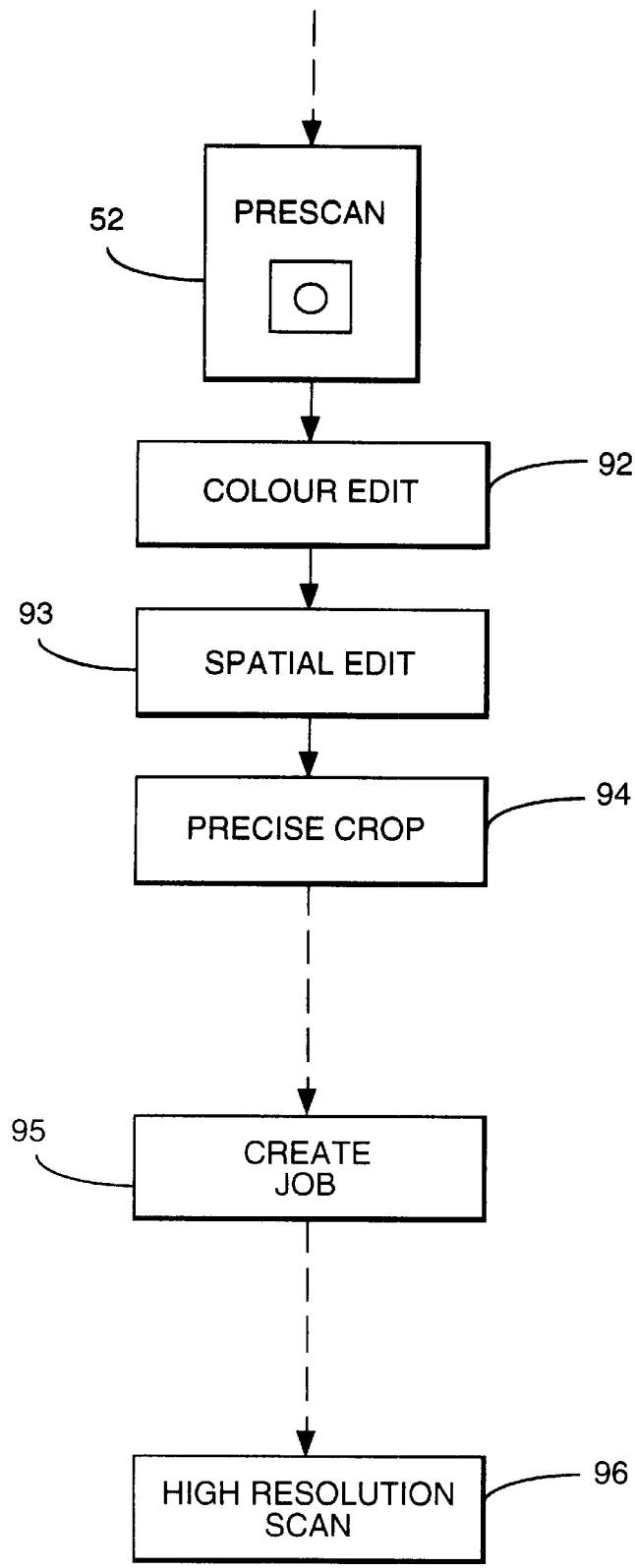

METHOD AND APPARATUS FOR GENERATING IMAGE DATA

FIELD OF THE INVENTION

The present invention relates to a method and apparatus for generating image data representative of an image on an input scanner support.

DESCRIPTION OF THE PRIOR ART

A conventional input scanning process is illustrated in FIG. 6. The input scanning process involves optically scanning an original (such as a transparency or 35 mm negative film) in order to generate high resolution image data suitable for output to an output device such as a printer. In a first step 60 the operator mounts the originals on a scanning surface. In the case of a drum scanner the originals are mounted on the outer surface of a transparent drum, and a scanning head moves along the axis of the drum during a scan and illuminates a spot on the drum. In the case of a flatbed scanner the originals are mounted on a transparent platen. In a second step 61 the operator locates the approximate location of each original on the scanner. This is commonly known as cropping. Cropping may be done in two ways; either (1) by manually revolving the drum and moving the scanning head such that the scanning spot is positioned at the top left hand corner of a rectangle containing the original, and then moving the spot to the bottom right hand corner of the rectangle. This is repeated for each original and the scanner coordinates of the rectangles are stored at 62; or (2) by performing a fast coarse scan of the entire drum or platen, displaying the low resolution image of the entire scanned surface on a workstation monitor screen and manually cropping the image of each original at the workstation. The image positions are then converted into scanner coordinates and stored at 62.

Once the scanner coordinates have been stored at 62, the scanner carries out a prescan 63–65 of each of the originals to generate a set of prescan image files 66–68. Each prescan image file 66–68 is made by carrying out an individual scan of each original at a particular resolution, with the aim being to generate a prescan image file of the order of 1 MB. The scanning rate and clock rates for each original may vary between originals due to variations in original size or other process parameters and therefore it is generally not possible to carry out all prescans in a single scan of the drum. When the scanner reaches the end position of a first original, the scanner moves to the start position of the next original (which may overlap with the first original) and then carries out a prescan of the second original. In general the resolution of each prescan image file is at an intermediate resolution higher than the resolution of the coarse scan (mentioned above at 1) but lower than the resolution of the high resolution scan (discussed below). This allows the prescans to be carried out in a reasonable time (of the order of 1minute each) and ensures that the size of the prescan image files (approx 1 MB) is small enough to enable operator edits 69–71 to be carried out quickly. In each operator edit 69–71 the operator carries out spatial correction and colour correction of the prescan image file, the corrected image being displayed on the monitor. The operator may also carry out a precise crop at 72–74 in order to more accurately define the image area (for instance by removing any rebate around the required image). When the operator is finished, a job file 75–77 is generated for each image (each carrying all relevant spatial and colour setup information for a respective image). The job files 75–77 are stored and used in a subsequent high resolution scan 78.

The conventional cropping procedure described above requires considerable operator time and effort.

EP-A-0598584 describes a method of automatically determining the location and size of a plurality of input media on a scanner. In a first step, location and size information is determined by performing a low resolution scan and automatically locating the four corners of each input medium. After locating the input media, selected media are scanned at low resolution (using the location and size information) to generate prescan files which can then be modified by the user. After modification, the location and size information is used to perform a full resolution scan.

SUMMARY OF THE INVENTION

In accordance with a first aspect of the present invention, there is provided a method of generating image data comprising digital pixel data representative of an image on an input scanner support, the method comprising 1) scanning said support to generate support image data at a first resolution comprising digital pixel data representative of said support and said image;

2) generating support image data at a second resolution from said support image data at said first resolution;

3) determining a boundary of said image by performing a predetermined boundary determining algorithm on said support image data at said second resolution; and, 4) extracting said image data from said support image data at said first resolution by extracting said pixel data within said boundary of said image determined in step 3).

The system of EP-A-0598584 requires a whole cylinder low resolution scan followed by a second low resolution scan for every prescan file which is generated. In contrast the present invention provides a method of generating image data in a single scan. As a result the image data is generated more quickly and efficiently. In addition, in the case where a plurality of images are present on the input scanner support, data at the first resolution for a first one of the images can be generated before the whole support has been scanned. This is not possible in the system of EP-A-0598584.

The second resolution may be higher than the first resolution. Preferably however the second resolution is lower than the first resolution. This results in a number of advantages. Firstly the boundary determining algorithm is performed quickly since it has less data to work on. Secondly the lower resolution data is less noisy than the higher resolution data, enabling boundaries to be determined more easily and accurately.

Typically the image data is saved as prescan data for an input scanning procedure. The prescan image data is then used to display a preview image and create job data which is utilized in a second, high resolution scan. The invention provides a method of automatically locating images on the input scanner support surface and generating data for one or more prescan images in a single scan of the input scanner support. There is a significant saving in operator time in comparison with prior art procedures.

Steps 1), 2), 3) and 4) may be carried out in a serial manner, e.g. the entire support may be scanned in step 1) before carrying out steps 2) to 4). However preferably all four steps are carried out in parallel, i.e. the image data is extracted as the support image data at the first resolution is generated and before step 1) is completed. This results in a further time saving. Typically a plurality of images are placed on the input scanner support, the boundary is determined for each image, and a respective set of prescan image data is generated for each of the images. When the boundary of a first one of the images has been determined in step 3), then preferably the image data for the first image is extracted whilst the scanner support is still being scanned and monitored for further images. This allows an operator to view and edit the first prescan image as soon as it is generated, and typically whilst the support is still being scanned for further images.

Typically the support image data is saved as a plurality of data files, and when the first data file has been saved and the boundary of the first image has been determined, the image data for the first image is extracted from the first data file.

Preferably steps 2) and 3) comprise generating a density map from the support image data, the density map having a resolution lower than the resolution of the support image data, and determining the boundary of the image within the density map. The density map is typically generated by summing colour values for each support image data pixel to generate a density value, discarding a predetermined number of the darkest pixels in an area adjacent to each density value, and summing the remaining light pixels in the adjacent area. In a preferable embodiment the density map is generated in two or more stages with the resolution decreasing at each stage, and dark pixels being discarded at each stage. This ensures that the automatic boundary defining step does not detect dust specks, tape edges or other sources of error.

Any suitable boundary locating algorithm may be used in step 3), for example the algorithm may locate the corners of an image on the support. However in a preferred embodiment the predetermined algorithm locates a pixel in the support image data at the second resolution having a value higher than a predetermined threshold and performs an edge-following algorithm starting from the located pixel.

Typically the image data is saved as prescan image data in a method of generating high resolution image data suitable for output to an output device. The method preferably further comprises performing a second high resolution scan of the image to generate the high resolution data using setup data derived from the prescan file. The lower resolution prescan data contains less data than the high resolution data and can be more readily displayed and edited as a preview image.

Typically the method further comprises colour editing and/or spatially editing the prescan image data.

Preferably the prescan data is further edited to remove unwanted rebate areas of the image (this step is known as a precise crop). The precise crop may be carried out automatically by determining the boundary of the required image area within the boundary of the image in accordance with a second predetermined algorithm. The second predetermined algorithm may be carried out on the support image data at a first resolution, or on the support image data at a second resolution. Preferably the high resolution scan is carried out within the boundary of the required image area as defined by the precise crop.

The second predetermined algorithm may be any suitable edge finding algorithm, and may be the same as the boundary determining algorithm. However preferably the second predetermined algorithm comprises (i) identifying a predominant colour at the edge of the image;

(ii) identifying image data pixels having the predominant colour;

(iii) identifying inner edge pixels of the area identified in step (ii); and (iv) interpolating a straight line through the edge pixels identified in step (iii).

If the precise crop is carried out automatically then this provides a method by which an operator can simply mount one or more originals on a scanner support, initiate the process and the process will automatically generate the required high resolution data without any further operator input.

In accordance with a second aspect of the present invention there is provided apparatus for generating image data comprising digital pixel data representative of an image on an input scanner support, the apparatus comprising 1) a scanner for scanning said support to generate support image data at a first resolution comprising digital pixel data representative of said support and said image; and a processor for 2) generating support image data at a second resolution from said support image data at said first resolution;

3) performing a predetermined boundary determining algorithm on said support image data at said second resolution to determine a boundary of said image; and 4) extracting said image data from said support image data at said first resolution by extracting said digital pixel data within said boundary of said image.

BRIEF DESCRIPTION OF THE DRAWINGS

An embodiment of the present invention will now be described and contrasted with the prior art in accordance with the accompanying figures, in which:

FIG. 5 is a flow diagram illustrating the continuation of the method shown in FIG. 3; and, FIG. 6 is a flow diagram illustrating a typical conventional input scanning process.

EMBODIMENT

Figure 1:
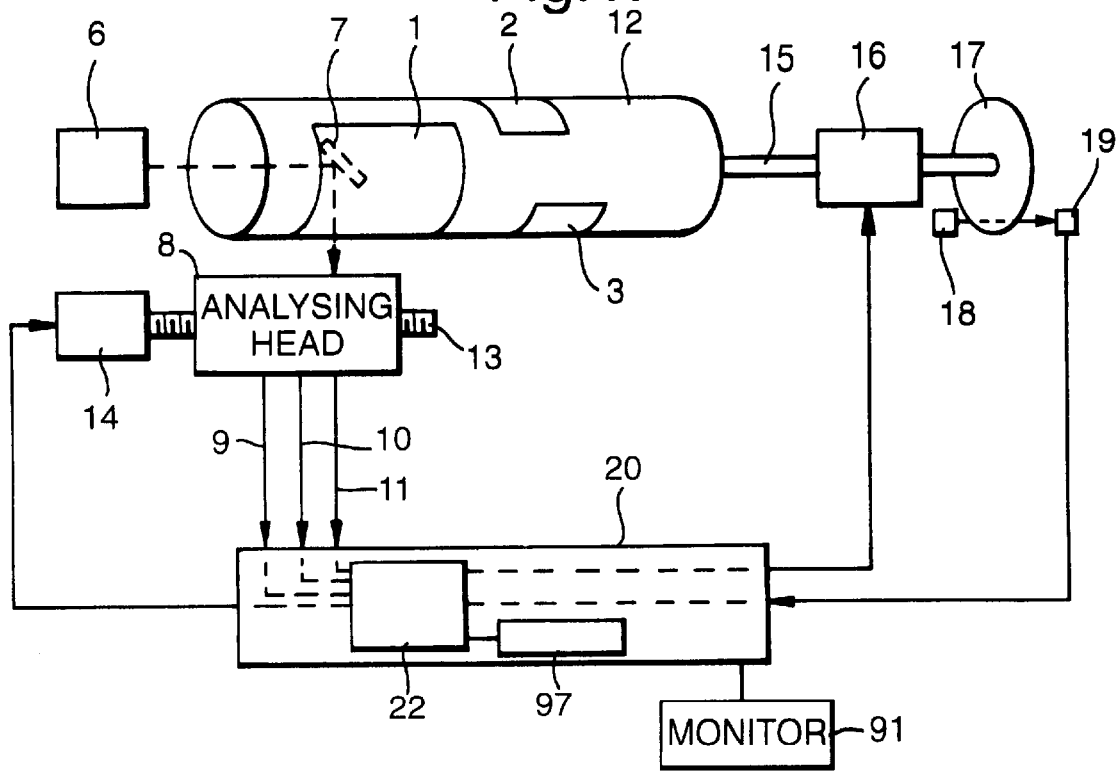
FIG. 1 illustrates an input scanning arrangement for carrying out the present invention.

In FIG. 1, transparent originals 1–3 (and originals 4, 5 not shown) are wrapped around the surface of a transparent drum 12. The originals are typically transparencies or negative films. A xenon lamp 6 directs light rays into the drum and on to a 45° mirror 7, from which the rays pass through the wall of the drum and through the transparent original 1. These light rays reach an analysing head 8 containing colour filter and photoelectric devices such that support image data signals representing the red, blue and green densities of the scanned element of the picture 1 are produced on lines 9, 10 and 11 respectively. The support image data signals on lines 9–11 are input to a work station 20 for processing and storage. The analysing head 8 is mounted on a lead screw 13 which is driven in synchronism with the mirror 7 and the rotation of the drum 12 by a motor 14. As a consequence, the analysing head sees a point on the drum 12 which, as the drum rotates and the analysing head moves along its lead screw, traces out a helical path along the drum 12 and consequently traces out a number of parallel scanning lines on the originals 1–5.

The drum 12 is mounted on a shaft 15 driven by a motor 16. The motor also drives a slotted disc 17, the slotted periphery of which rotates between a light source 18 and a photoelectric cell 19. Pulses from the photoelectric cell 19 are counted internally in the scanner to define the position of the support. This is converted to position coordinates. It is these coordinates which are included in the job definition sent to and from the workstation 20. Alternatively the disc 17 may comprise an optical grating. In a further alternative the position of support may be encoded by a magnetic sensor.

During a scanning process the drum 12 rotates and the mirror 7 and analysing head 8 move together along the cylinder in order to scan the entire drum 12. The time taken to scan the entire drum is dependent upon the required image resolution. For high image resolution, the scan rate must be low.

Figure 2:
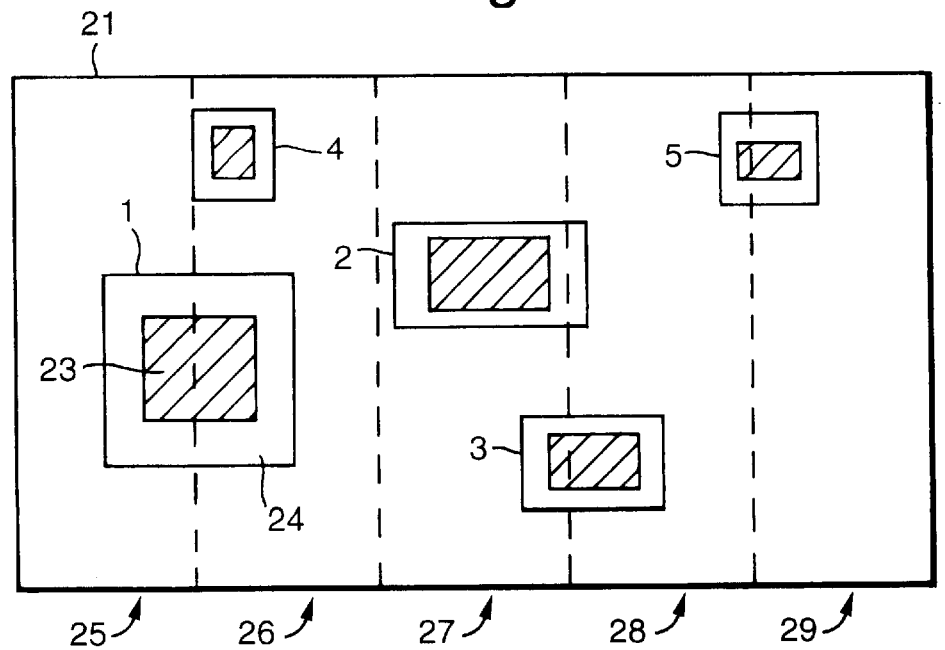
FIG. 2 is a view of the surface of the drum scanner carrying five originals.

FIG. 2 represents the outer surface of the drum 12 as a flat rectangular surface 21. The surface 21 carries the five transparencies 1–5 arranged in arbitrary positions on the surface 21. In a typical device, up to approximately fifty originals may be mounted on the drum but only five are shown in FIG. 2 for clarity. Each transparency typically comprises an inner image area 23 and an outer rebate area 24. The rebate area 24 contains unwanted image material such as film sprockets etc., and the inner image area 23 contains the image of interest. During a scanning operation the drum surface 21 is nominally divided into five separate strips 25–29 as discussed below.

Figure 3:
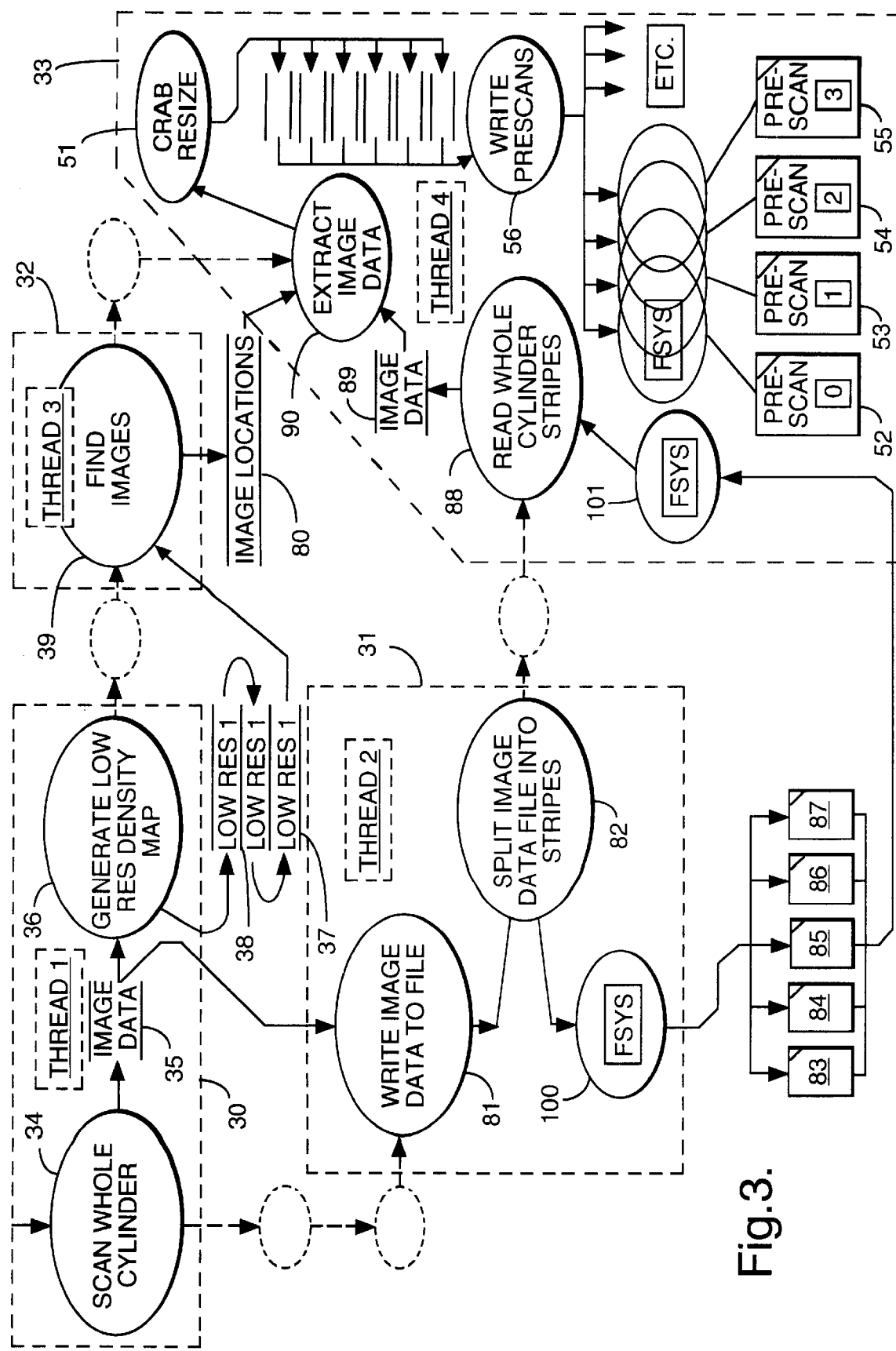
FIG. 3 is a data and control flow diagram illustrating the method according to the present invention.

Workstation 20 comprises a processor 22 and suitable stores 97 for storing image data. The processor controls the method of the present invention as illustrated in FIG. 3. FIG. 3 is a schematic diagram in which solid ellipses illustrate steps carried out by the processor, dotted lines and dotted ellipses illustrate transfer of control information, solid arrows illustrate transfer of data, pairs of solid parallel lines illustrate items of stored data and solid rectangles represent stored image data files.

The process illustrated in FIG. 3 contains four threads labelled 30–33. All four threads 30–33 run simultaneously as discussed below.

Figure 4A:
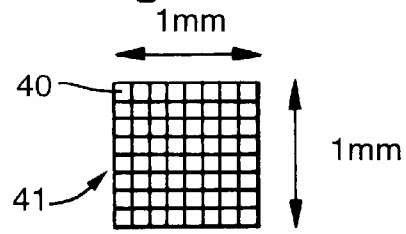
FIG. 4A illustrates a block of image data pixels.

In a first thread 30, the processor 22 scans the entire drum surface 12 at eight lines per mm as indicated at 34. The resolution of eight lines per mm is chosen to be low enough to allow the entire scan 34 to be carried out in a reasonable time (of the order of 5 minutes), whilst being high enough to give a reasonable prescan image resolution for the smallest originals (which will generally be 35 mm film). The RGB image data received on lines 9–11 is inverted to give CMY values and stored at 35. The image data stored at 35 comprises a set of 32 bit words, with 8 bits of each 32 bit word allocated to each colour C, M, Y, and the remaining 8 bits being an unused packing byte. The CMYX values (where X represents the unused packing byte) are converted at a later stage to CMYK values—this corrects errors in the simple inversion process from RGB to CMY, as well as generating a black value. The values may be converted to CMYK either during the high resolution scan (illustrated at 96 in FIG. 5 below) or during the "create job" phase (illustrated at 95 in FIG. 5 below). In step 36, the processor generates a low resolution pixel density map 37 from the image data 35. Generation of the low resolution pixel density map 37 is illustrated in FIGS. 4A–4C.

The lower resolution density map is produced from the image data 35 in two stages. A 1 mm square portion 41 of the image data 35 is illustrated in FIG. 4A. In a first stage the microprocessor 10 takes every pixel 40 and adds the C, M and Y values together to give a density. The processor 22 then sums the 12 lightest pixels from every 0.25 square mm of the original (i.e. the darkest four pixels sampled from every 0.5 mm×0.5 mm of the original are actually discarded) to generate 0.5 mm×0.5 mm first stage pixels 51–54 which are stored at 38 (FIG. 3). The first stage pixel 51 illustrated in FIG. 4B has the four darkest pixels 42–45 illustrated.

Figure 4B:
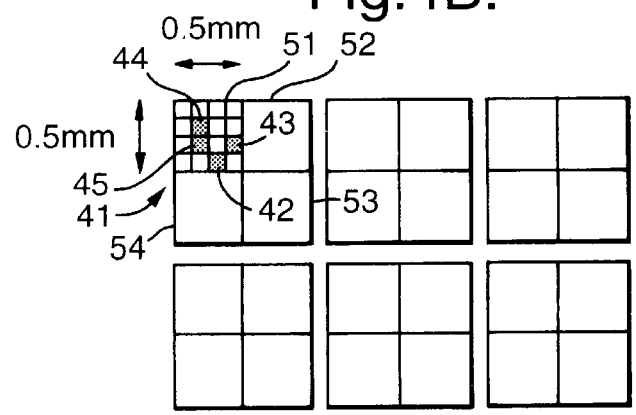
FIG. 4B illustrates a block of first step low resolution pixels.
Figure 4C:
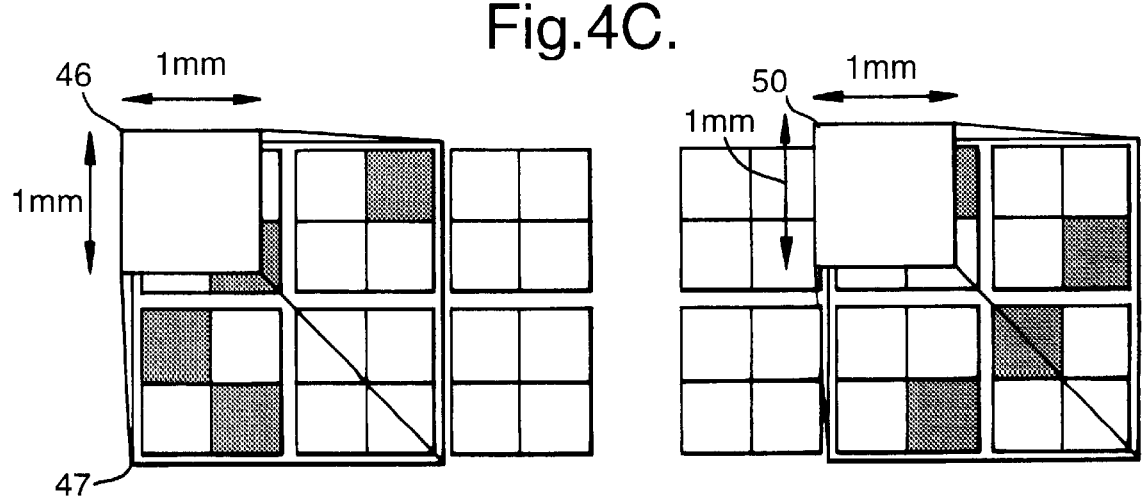
FIG. 4C illustrates the generation of two second step low resolution pixels.
Figure 6:
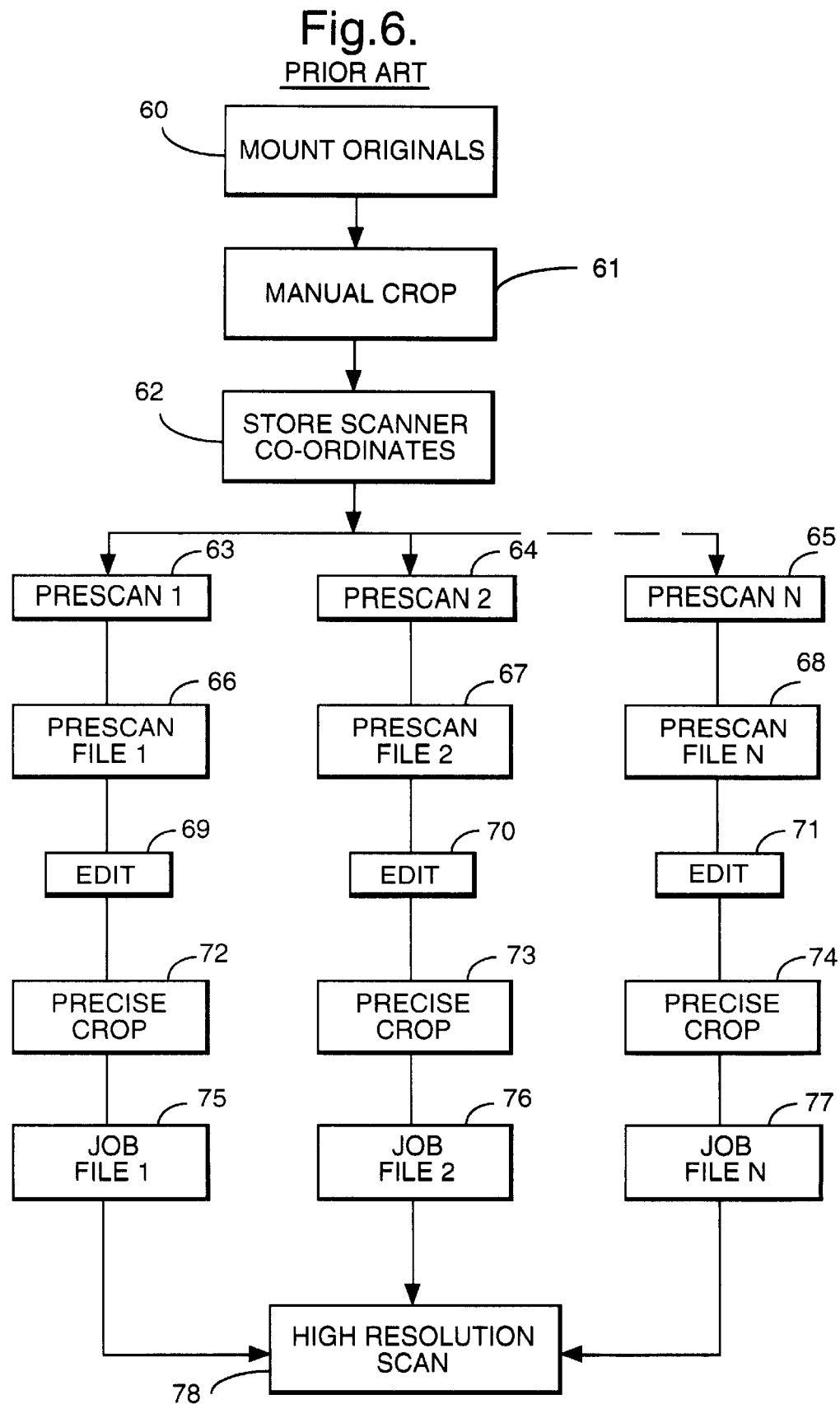

In a second stage illustrated in FIG. 4C a low resolution (1 pixel per square mm) pixel density map is generated. Each second stage pixel 46, 50 is generated by summing the density of the 12 lightest of 16 first stage pixels. The 16 first stage pixels involved are those from an area 47 of 4 square mm sharing the same top left coordinate. FIG. 4C illustrates the generation of two adjacent second stage pixels 46, 50. The second stage pixels are stored at 37 (FIG. 3).

The first and second stages illustrated in FIGS. 4B and 4C are designed to minimise or remove the influence of dust specks (in the first stage) and tape edges (second stage) from the low resolution density map. Dust specks typically result in dark areas of the order of 0.125 mm×0.125 mm. Therefore by throwing away the four darkest pixels 42–45 in stage 1 (FIG. 4B), their influence can be minimised. Tape is used to fix the transparencies onto the outer surface of the drum 1, and the edge of the tape typically results in a dark line of the order of 0.5 mm wide. Tape edges are reduced by throwing away the four darkest pixels in stage 2 (FIG. 4C).

As the low resolution density map 37 is generated, the microprocessor in step 39 (thread 3) scans the density map 37 in order to locate and store the edges of the transparencies 1–5. The processor 22 first scans the density map 37 looking for a low resolution pixel 46, 50 above a predefined density level (termed the background level). Having found one of these, the processor 22 then traces around the area above the background level of which the initially found pixel is a part (using a wall following type of algorithm). If the area traced is above a predefined size then it is identified as a transparency and its coordinates are stored at 80. The microprocessor then continues to look for pixels above the background level.

While the image data 35 is being processed in threads one and three, thread two 31 writes the image data 35 to file at 81 and splits the image data file into strips at 82 which are saved in five image data files 83–87. FSYS steps 100, 101 are used to control file formats and the reading of image files to and from disc.

When the first image data file 83 has been saved, thread four (labelled 33) commences. The processor reads an image file (for instance 83) at 88 which is stored at 89.

The microprocessor then separates out parts of the image file 83 containing transparency data and non-transparency data at 90. The processor 20 reads in the strip image file stored at 89 and the transparency edge coordinates stored at 80. The strip image data file 89 is read out in chunks of two to four MB. The parts of the data file 89 within the transparency edge coordinates as defined in the store 80 are read out into a first data buffer, and the parts of the strip image data file outside the transparency coordinates are read into a second buffer. The separated image data stored in the first buffer is resized by suitable hardware or software interpolation at 51 and written to a prescan image file 52–55 at 56. The unwanted data in the second buffer is discarded.

When all data available in a strip for an image is extracted then the data for the next image contained in the same strip is extracted to the second buffer. The strip may not contain a whole image and so image individual data buffers are gradually built up strip by strip. The process is repeated for each image in a strip. When all image data from a strip is extracted then the strip is discarded and the next strip read in.

FIG. 5 illustrates the continuation of the method illustrated in FIG. 3.

When a complete transparency image has been stored as a prescan image file 52–55, the operator is then free to carry out a number of editing operations as illustrated in FIG. 5. The editing operations shown in FIG. 3 are generally carried out on each prescan file, but the parallel nature of the autocrop process of FIG. 3 means that the operator can start editing the first prescan file 52 as soon as it is created (and whilst threads 1–4 are still running).

The prescan image file 52 is displayed on the workstation monitor screen 91 and in a colour edit step 92 the operator alters the colour parameters if colour or tonal correction is required. In a spatial edit step 93 the operator carries out suitable spatial editing such as contrast enhancement. In step 94 the operator carries out a precise cropping operation by identifying the edge of the required image area 23, allowing the outer rebate area 24 (or any other area as defined by the operator) to be discarded.

When the operator is happy with the appearance of the image the parameters defined in steps 92–94 are then used to create a job at 95 which is added to a batch of jobs (one or more for each transparency). Each job contains inter alia the white and black points, scanner coordinates and colour setup parameters for an image.

When the entire scan has been completed and a number of job files (in this case 5—one for each transparency) have been created, a high resolution scan 96 is carried out. A high resolution scan is carried out as a separate queued item for each job file.

Instead of defining the entire outer edge of the inner image area 23 during the precise crop 94, the operator may only indicate a single point of the edge of the image area 23. The remaining parts of the rebate area of the image 23 can then be detected automatically by processor 22 using a suitable wall following type algorithm.

In a further alternative the entire precise crop operation 94 may be carried out automatically before or after the generation of the prescan image files 52–55. A suitable method is set out below.

(1) Identify a predominant colour at the edge of the original 1–5. This will generally be the colour of the rebate area 24. For instance in the case of transparencies the rebate area 24 will typically be black, and in the case of negatives it will be white.

(2) Identify the rebate area containing pixels having the predominant colour.

(3) Identify inner edge pixels of the area identified in step (2).

(4) Interpolate a straight line through the edge pixels identified in (3). This is required since parts of the outer edge of the image 23 may have the same colour as the rebate area 24.

The apparatus described has been a drum input scanner with image processing carried out by a suitably programmed workstation. However the invention may equally be carried out on a flatbed input scanner. In addition, the processing steps may also be carried out by suitable hardware devices.

I claim:

1. A method of generating image data comprising digital pixel data representative of an image on an input scanner support, the method comprising:

1) scanning said support to generate support image data at a first resolution comprising digital pixel data representative of said support and said image;

2) generating support image data at a second resolution from said support image data at said first resolution;

3) determining a boundary of said image by performing a predetermined boundary determining algorithm on said support image data at said second resolution; and, 4) extracting said image data from said support image data at said first resolution by extracting said pixel data within said boundary of said image determined in step 3);

wherein said support image data at said second resolution is generated by summing groups of pixel data values of said support image data at said first resolution; and wherein said support image data at said second resolution is generated by dividing each said group of pixel data values into a set of light pixel values and a set of dark pixel values, summing said set of light pixel values, and discarding said set of dark pixel values.

2. A method according to claim 1 wherein said second resolution is lower than said first resolution.

3. A method according to claim 1, wherein said support image data at said first resolution comprises colour image data, and wherein said support image data at said second resolution comprises the density image data.

4. A method according to claim 1, wherein said steps 1), 2), 3) and 4) are carried out in parallel.

5. A method according to claim 1, wherein said support image data at said first resolution is saved as a plurality of data files, and when a first one of said data files has been saved and a boundary of said image has been determined in step 3), said image data is extracted from said first one of said data files.

6. A method according to claim 1, wherein said predetermined boundary determining algorithm locates a pixel in said support image data at said second resolution having a value higher than a predetermined threshold and performs an edge following algorithm starting from said located pixel.

7. A method according to claim 1, wherein said image data is representative of a plurality of images, and wherein said scanning step comprises scanning said support to generate support image data at a first resolution comprising digital pixel data representative of said support and said plurality of images.

8. A method of generating image data comprising digital pixel data representative of an image on an input scanner support, the method comprising:

1) scanning said support to generate support image data at a first resolution comprising digital pixel data representative of said support and said image;

2) generating support image data at a second resolution from said support image data at said first resolution;

3) determining a boundary of said image by performing a predetermined boundary determining algorithm on said support image data at said second resolution; and, 4) extracting said image data from said support image data at said first resolution by extracting said pixel data within said boundary of said image determined in step 3);

wherein said support image data at a second resolution is generated by generating support image data at a third resolution between said first and second resolutions, and generating said support image data at said second resolution from said support image data at said third resolution.

9. A method according to claim 8 wherein said support image data at said third resolution is generated by summing groups of pixel values of said support image data at said first resolution; and wherein said support image data at said second resolution is generated by summing groups of pixel values of said support image data at said third resolution.

10. A method of generating high resolution image data comprising digital pixel data representative of an image on an input scanner support, said high resolution data being suitable for output to an output device, the method comprising 1) scanning said support to generate support image data at a first resolution comprising digital pixel data representative of said support and said image;

2) generating support image data at a second resolution from said support image data at said first resolution;

3) determining a boundary of said image by performing a predetermined boundary determining algorithm on said support image data at said second resolution;

4) extracting prescan image data from said support image data at said first resolution by extracting said pixel data within said boundary of said image determined in step 3); and 5) scanning said support within said boundary to generate said high resolution data, wherein said high resolution image data is at a resolution higher than said first and second resolutions.

11. A method according to claim 10 further comprising colour editing and/or spatially editing said prescan data.

12. A method according to claim 10, further comprising determining a boundary of a required image area within said boundary of said image in accordance with a second predetermined algorithm.

13. A method according to claim 12 wherein said second predetermined algorithm comprises (i) identifying a predominant colour at an edge of said image;

(ii) identifying image data pixels having said predominant colour;

(iii) identifying inner edge pixels of said pixels identified in step (ii); and (iv) interpolating a straight line through said inner edge pixels identified in step (iii).

14. A method according to claim 12 further comprising scanning said support within said boundary of said required image area to generate high resolution image data suitable for output to an output device at a resolution higher than said first and second resolutions.

15. A method according to claim 10, wherein said image data is representative of a plurality of images, and wherein said scanning step comprises scanning said support to generate support image data at a first resolution comprising digital pixel data representative of said support and said plurality of images.

16. A method according to claim 10, further comprising determining a boundary of a required image area within said boundary of said image determined in step 3), and carrying out the scanning in step 5) within said inner boundary.

17. Apparatus for generating image data comprising digital pixel data representative of an image on an input scanner support, the apparatus comprising 1) a scanner for scanning said support to generate support image data at a first resolution comprising digital pixel data representative of said support and said image; and a processor for 2) generating support image data at a second resolution from said support image data at said first resolution;

3) performing a predetermined boundary determining algorithm on said support image data at said second resolution to determine a boundary of said image; and 4) extracting said image data from said support image data at said first resolution by extracting said digital pixel data within said boundary of said image;

wherein said support image data at said second resolution is generated by summing groups of pixel data values of said support image data at said first resolution; and wherein said support image data at said second resolution is generated by dividing each said group of pixel data values into a set of light pixel values and a set of dark pixel values, summing said set of light pixel values, and discarding said set of dark pixel values.

18. An apparatus according to claim 17, wherein said image data is representative of a plurality of images on an input scanner, and wherein said apparatus comprises a scanner for scanning said support to generate support image data at a first resolution comprising digital pixel data representative of said support and said plurality of images.

* * * * *